(12) United States Patent
Hidaka (10) Patent No.: US 7,902,883 B2
(45) Date of Patent: Mar. 8, 2011

(54) PREEMPHASIS DRIVER WITH REPLICA BIAS

(75) Inventor: Yasuo Hidaka, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/488,790

(22) Filed: Jun. 22, 2009

(65) Prior Publication Data

US 2009/0315592 A1    Dec. 24, 2009

Related U.S. Application Data

(60) Provisional application No. 61/074,432, filed on Jun. 20, 2008.

(51) Int. Cl.
*H03K 3/00* (2006.01)

(52) U.S. Cl. ......... 327/108; 327/112; 327/329; 327/389; 327/170; 326/30; 326/82

(58) Field of Classification Search .......... 327/108–112, 327/329, 389, 391, 170; 326/30, 82–83, 326/86, 87
See application file for complete search history.

(56) References Cited

U.S. PATENT DOCUMENTS

| | | | | |
|---|---|---|---|---|
| 6,111,431 A | 8/2000 | Estrada | | 326/83 |
| 6,262,606 B1 | 7/2001 | Tamjidi | | 327/108 |
| 6,313,662 B1 | 11/2001 | Ide | | 326/83 |
| 6,353,334 B1 | 3/2002 | Schultz | | 326/82 |
| 6,388,477 B1 * | 5/2002 | Juang | | 327/112 |
| 6,911,841 B2 | 6/2005 | Lee et al. | | 326/39 |
| 6,930,506 B2 * | 8/2005 | Cranford et al. | | 326/30 |
| 6,990,644 B2 | 1/2006 | Feng | | 327/141 |
| 6,992,508 B2 | 1/2006 | Chow | | 326/86 |
| 7,135,887 B1 | 11/2006 | Shumarayev et al. | | 326/38 |
| 7,138,825 B2 | 11/2006 | Kim et al. | | 326/115 |
| 7,236,013 B2 | 6/2007 | Kasanyai et al. | | 326/87 |
| 7,268,623 B2 | 9/2007 | Kim et al. | | 327/112 |
| 7,301,371 B2 | 11/2007 | Kim | | 326/82 |
| 7,427,878 B2 | 9/2008 | Jiang et al. | | 326/83 |
| 7,576,567 B2 | 8/2009 | Jiang et al. | | 326/83 |
| 7,579,872 B2 | 8/2009 | Jiang | | 326/83 |
| 2004/0257127 A1 * | 12/2004 | Levin et al. | | 327/112 |
| 2008/0143326 A1 * | 6/2008 | Voisine et al. | | 324/207.26 |
| 2009/0140778 A1 * | 6/2009 | Kikuchi et al. | | 327/108 |
| 2009/0316767 A1 | 12/2009 | Hidaka | | |

(Continued)

OTHER PUBLICATIONS

Ng et al., "Low Power Gbit/sec Low Voltage Differential Signaling I/O System," Electrical Engineering and Computer Science, University of California, Berkeley, http://www.ocf.berkeley.edu/~eng/classes/241Report.pdf; 7 pages, Jun. 29, 2006.

(Continued)

*Primary Examiner* — Lincoln Donovan
*Assistant Examiner* — Shikha Goyal
(74) *Attorney, Agent, or Firm* — Baker Botts L.L.P.

(57) ABSTRACT

In one embodiment, a system includes a replica driver that includes n-type digital-to-analog converter (NDAC) current sources. The replica driver can produce a reference voltage based on current supplied by the NDAC current sources. The system includes driver fingers that are coupled to the replica driver and each include a driver bias circuit and an output driver. The driver bias circuit includes an operational amplifier (op-amp) that can adjust current-source gate voltage in the output driver to produce voltages at output nodes of the driver fingers that approximately match the reference voltage produced by the replica driver.

18 Claims, 6 Drawing Sheets

U.S. PATENT DOCUMENTS

| | | |
|---|---|---|
| 2009/0316769 A1 | 12/2009 | Hidaka |
| 2009/0316770 A1 | 12/2009 | Hidaka |
| 2009/0316771 A1 | 12/2009 | Hidaka |
| 2009/0316772 A1 | 12/2009 | Hidaka |

OTHER PUBLICATIONS

Non-Final Office Action, U.S. Appl. No. 11/421,522, 13 pages, Aug. 23, 2007.

Final Office Action, U.S. Appl. No. 11/421,522, 9 pages, Jan. 30, 2008.

Advisory Action, U.S. Appl. No. 11/421,522, 7 pages, Apr. 16, 2008.

Examiner's Inteview Summary, U.S. Appl. No. 11/421,522, 4 pages, May 5, 2008.

* cited by examiner

PREEMPHASIS DRIVER WITH REPLICA BIAS

RELATED APPLICATION

This application claims the benefit, under 35 U.S.C. §119(e), of U.S. Provisional Patent Application No. 61/074,432, entitled Preemphasis Driver With Replica Bias Circuit, filed 20 Jun. 2008.

TECHNICAL FIELD

This disclosure relates generally to electrical communication.

BACKGROUND

For high-speed digital-communication transmitter-driver design, precise output amplitude level control is often necessary, especially when utilizing finite impulse response (FIR) filter functionality. Because of the relatively large voltage-swing requirement for various standards such as IEEE 802.3ap 10GBASE-KR, and IEEE 802.3ak 10GBASE-CX4, previous methods for current mirroring between control circuits and output drivers tend to introduce large amplitude variation at the output of a transmitter.

DESCRIPTION OF EXAMPLE EMBODIMENTS

Figure 1:
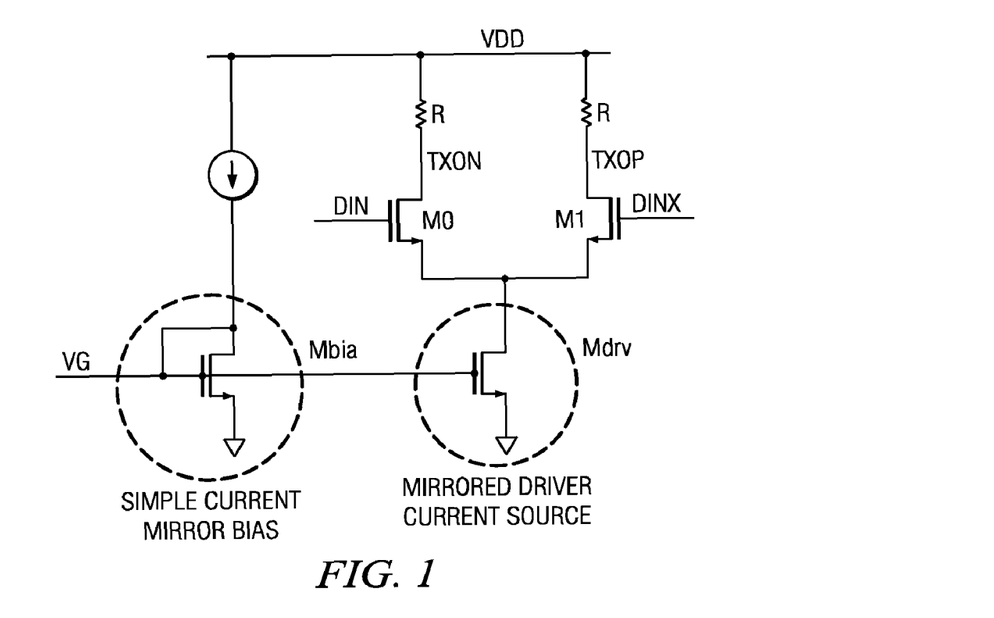
FIG. 1 illustrates an example mirrored driver current source.
Figure 2:
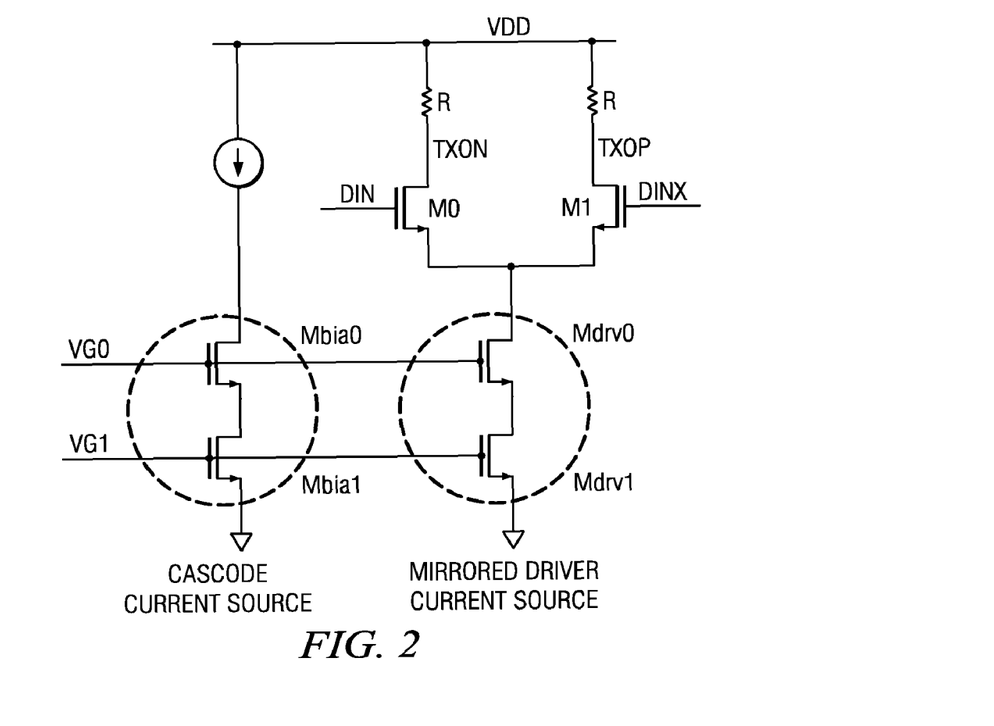
FIG. 2 illustrates an example cascode topology for a mirrored driver current source.

FIG. 1 illustrates an example mirrored driver current source. The driver current source Mdrv does not substantially match the bias current source Mbia, due at least in part to significant variations at the drain node of the Mbia transistor and the Mdrv transistor at process, temperature, and voltage (PVT) corners when power-supply voltage is 1.2V or less in complementary metal-oxide-semiconductor (CMOS) technology. One previous method for addressing this problem is to improve the bias current source with a cascode topology, as FIG. 2 illustrates. This implementation usually reduces mirrored driver current source variation, also reducing driver output voltage amplitude variation at PVT corners. However, this implementation tends to require larger device size and higher capacitance in the signal path, which tends to degrade driver slew rate (as is the case with CG drivers) or to degrade return loss (as is the cause with low-voltage differential signaling (LVDS) drivers). Another previous method for addressing the problem of mismatched driver and bias current sources is to create a ratioed replica bias circuit corresponding to driver output that does not include any preemphasis function.

Figure 3:
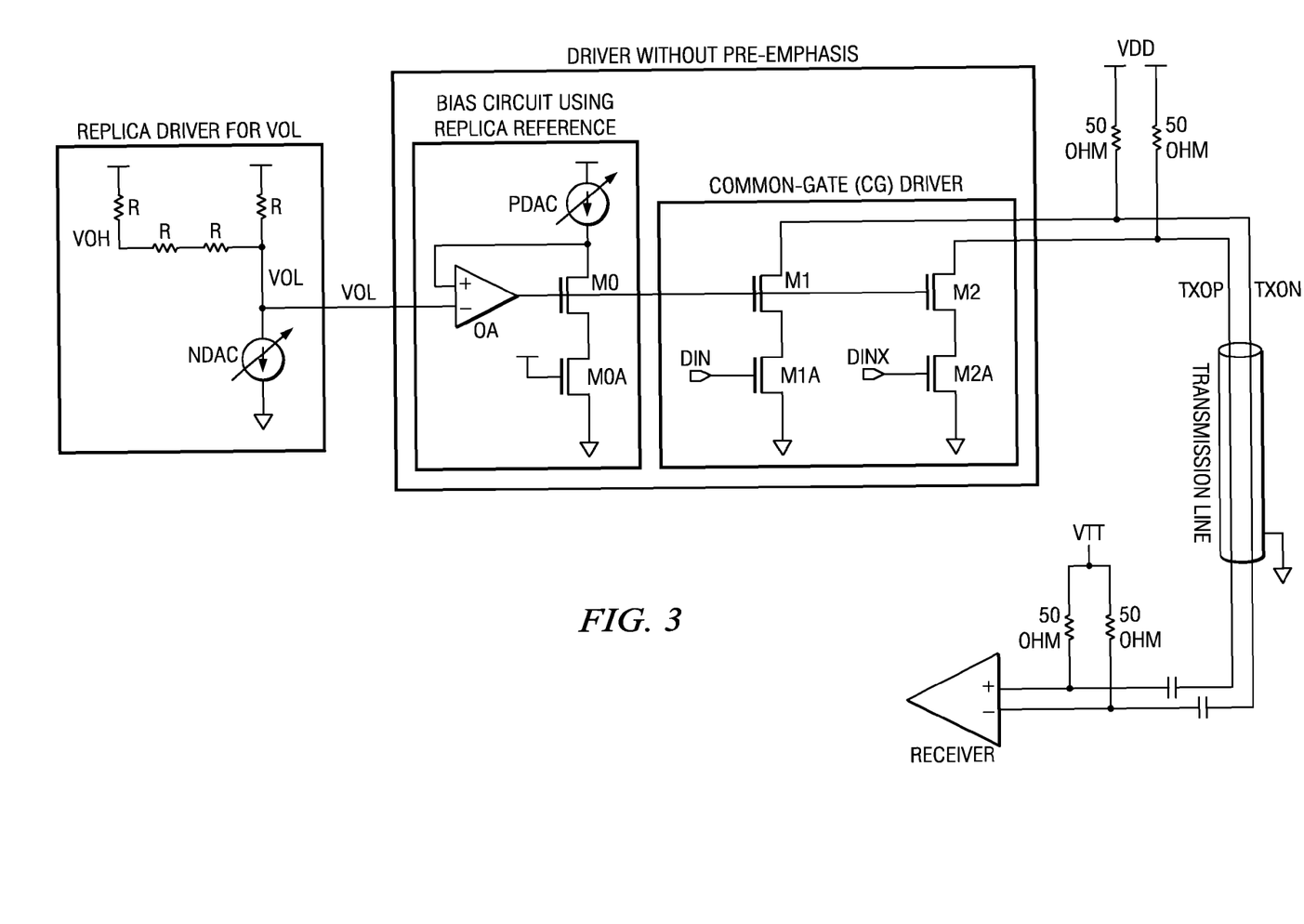
FIG. 3 illustrates an example common-gate (CG) driver with an example replica driver.

FIG. 3 illustrates an example CG driver with an example replica driver. The replica driver provides a low-output voltage (VOL) reference. In particular embodiments, VOL is an accurate copy of the drain voltage of the CG driver n-type metal-oxide-semiconductor (NMOS) current sources M1 and M2. The op-amp in the bias circuit adjusts the gate voltage of the CG driver current sources M1 and M2 so that the low voltage at the driver output node TXOP or TXON substantially matches VOL. In the replica driver, the resistors (or replica resistors) may be scaled copies of driver output resistors, which are two 50Ω driver-termination resistors and two 50Ω receiver-input resistors. The resistance of the replica resistors may be m times (m>1) the resistance of the driver-termination resistors. An ideal replica n-type digital-to-analog converter (NDAC) current source in the replica driver may be 1/m times the actual CG driver current, either through M1 and M1A or through M2 and M2A.

Particular embodiments implement a preemphasis driver with a replica bias circuit. Particular embodiments do so while reducing variation in peak amplitude. In particular embodiments, one difficulty in the implementation a preemphasis driver with a replica bias circuit is the problem of significant variation in the preemphasis ratio, which results from the preemphasis ratio being a ratio of two amplitudes— peak amplitude and low-frequency-period amplitude (see, for example, FIG. 6)—whereas the replica bias circuit represents only one type of amplitude. The replica bias circuit may control one amplitude, but another amplitude will be uncontrolled.

Figure 4:
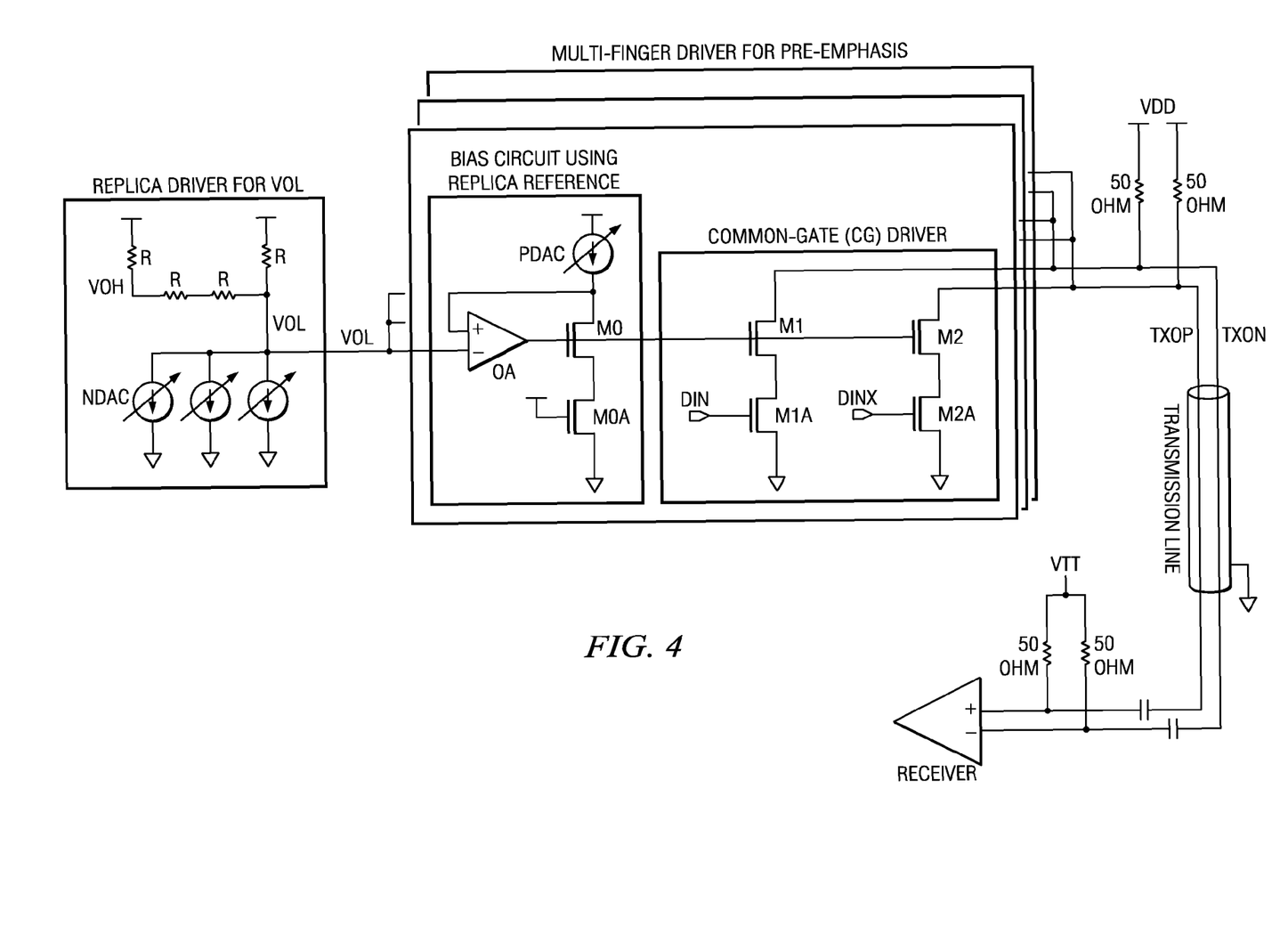
FIG. 4 illustrates an example multi-finger CG driver with an example replica driver.

FIG. 4 illustrates an example multi-finger CG driver with an example replica driver. In FIG. 4, the replica driver has three n-type digital-to-analog converter (NDAC) current sources (which may be NMOS) connected to VOL. Each of the NDAC current sources is a digital-to-analog converter (DAC) for current, with its current being mirrored to a corresponding p-type DAC (PDAC) in the replica bias circuits (or op-amp blocks). The resulting NDAC current determines VOL. In particular embodiments, there are three NDACs and three PDACs. The present disclosure contemplates any suitable number of NDACs and any suitable number of PDACs.

Figure 5:
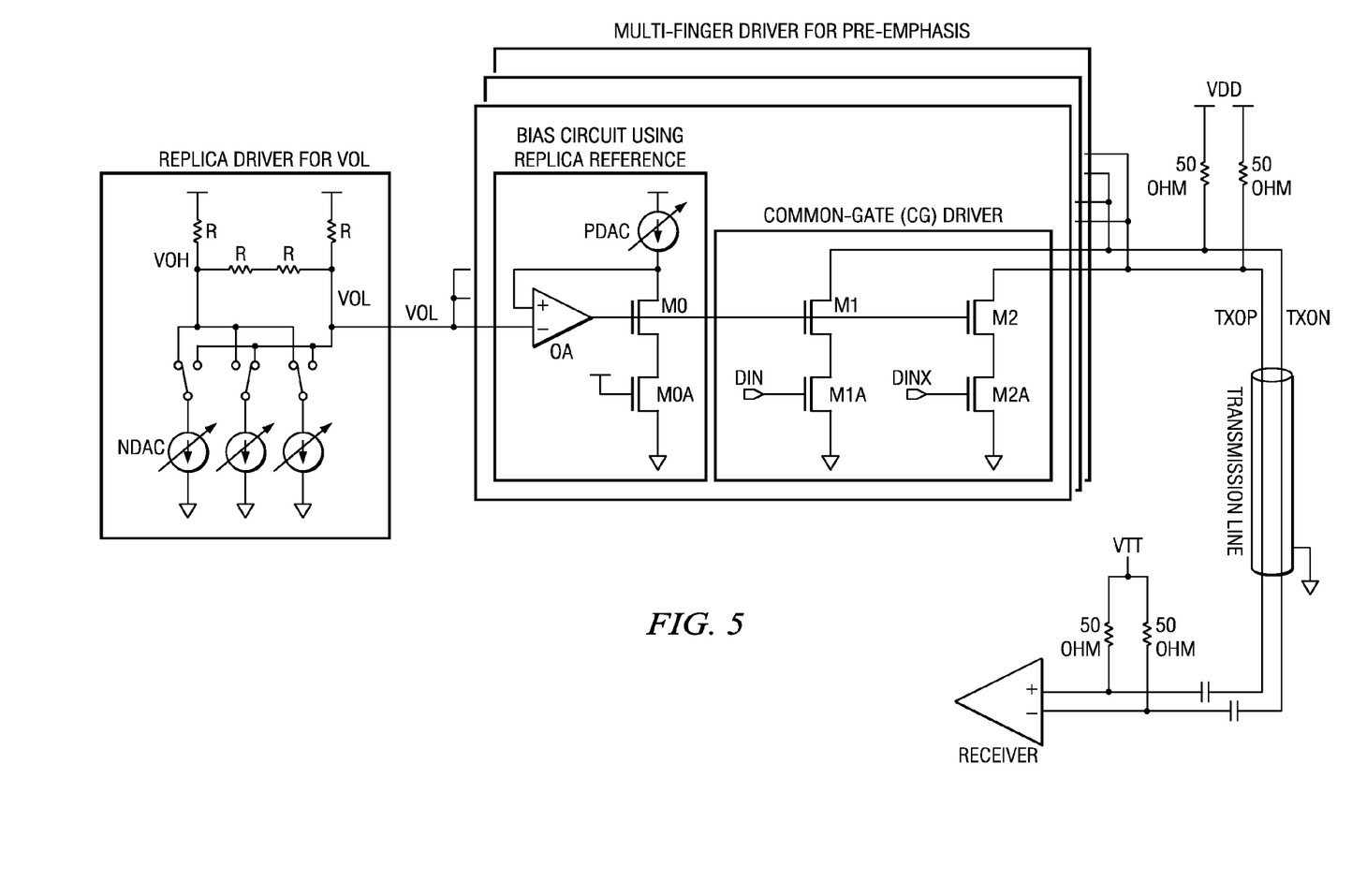
FIG. 5 illustrates an example multi-finger CG driver with an example switch-controlled replica driver

FIG. 5 illustrates an example multi-finger CG driver with an example switch-controlled replica driver. In FIG. 5, the switches in the replica driver facilitate control of CG-driver output amplitude by a single NDAC current source in the replica driver. Each of the NDAC current sources connects either to a high-output voltage (VOH) reference or to VOL through a switch. Particular embodiments digitally control the switches in the replica driver. In particular embodiments, there are three circuit paths combined at the output of the multi-finger CG driver. In particular embodiments, there are three NDAC current sources.

Figure 6:
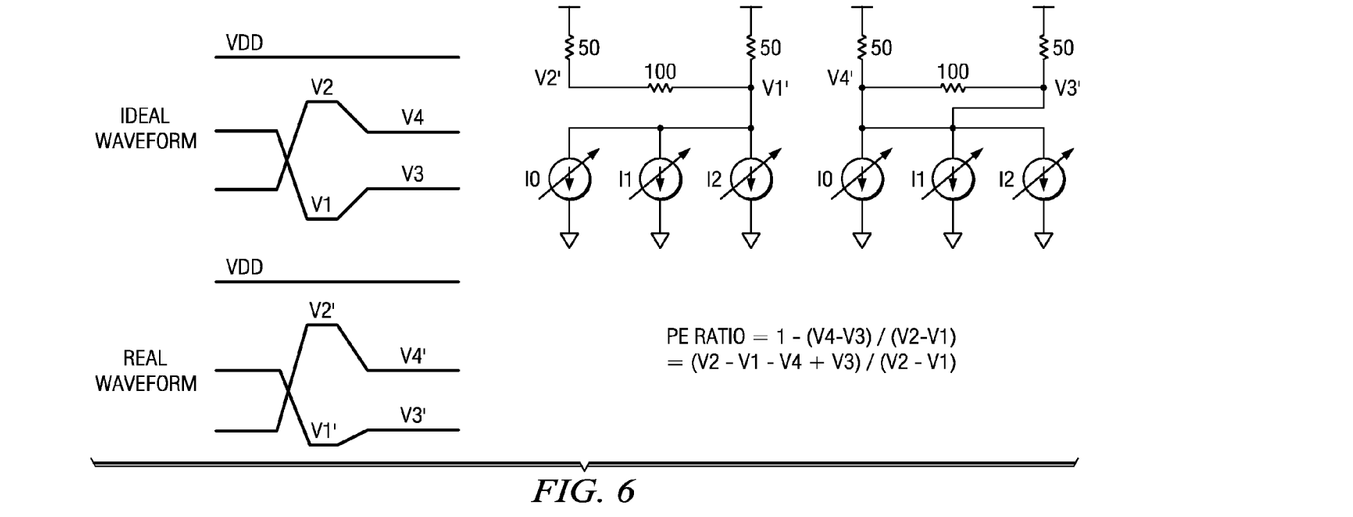
FIG. 6 illustrates example ideal driver output peak and valley voltages and ideal low-frequency-period low and high voltages.

To understand how the replica driver in FIG. 5 affects multi-finger CG driver output and preemphasis ratio, assume that the left NDAC, middle NDAC, and right NDAC current sources are NI0, NI1, and NI2, respectively. FIG. 6 defines ideal driver output valley and peak voltages to be V1 and V2, respectively, and defines ideal low-frequency-period low and high voltages to be V3 and V4, respectively. Preemphasis ratio may be expressed in terms of V1, V2, V3, and V4. In reality, the driver-output waveforms are nonideal and are therefore denoted as V1', V2', V3' and V4'. The driver tail currents are I0, I1, and I2. In general, I1 is greater than I0 and I2. Depending on the selections of the switches in the replica driver in FIG. 5, the real driver-output waveform and preemphasis ratio may be calculated as follows.

Let i0, i1, and i2 be errors corresponding to I0, I1, and I2, respectively, due to voltage difference between VOL and the drain nodes of M1 and M2. If the NDAC current sources all have the same current flow and are all connected to VOL by their switches, the real driver-output voltage and preemphasis ratio will be:

$$V1'=V1$$

$$V2'=V2$$

$$V3'=V3-37.5*i1-12.5*(i0+i2)$$

$$V4'=V4-12.5*i1-37.5*(i0+i2)$$

$$PE\ \text{ratio}' = 1 - \frac{(V4'-V3')}{(V2'-V1')} = \frac{(V2-V1-V4+V3-25*(i1-i0-i2))}{(V2-V1)}$$

The implementation illustrated by FIG. 4 would have substantially the same result.

Let i0, i0b, i1, i2, and i2b be errors corresponding to I0, I1, and I2, respectively, due to voltage difference between VOL and the drain nodes of M1 and M2. If the NDAC current sources NI0 and NI2 are connected to VOH and the NDAC current source NI1 is connected to VOL, the real driver-output voltage and preemphasis will be:

$$V1'=V1+37.5*(i0+i1+i2)$$

$$V2'=V2+12.5*(i0+i1+i2)$$

$$V3'=V3-12.5*(i0b+i2b)$$

$$V4'=V4-37.5*(i0b+i2b)$$

$$PE\ \text{ratio}' = 1 - \frac{(V4'-V3')}{(V2'-V1')} = \frac{\begin{pmatrix} V2-V1-V4+V3-25* \\ (i0+i1+i2-i0b-i2b) \end{pmatrix}}{(V2-V1-25*(i0+i1+i2))}$$

Figure 7:
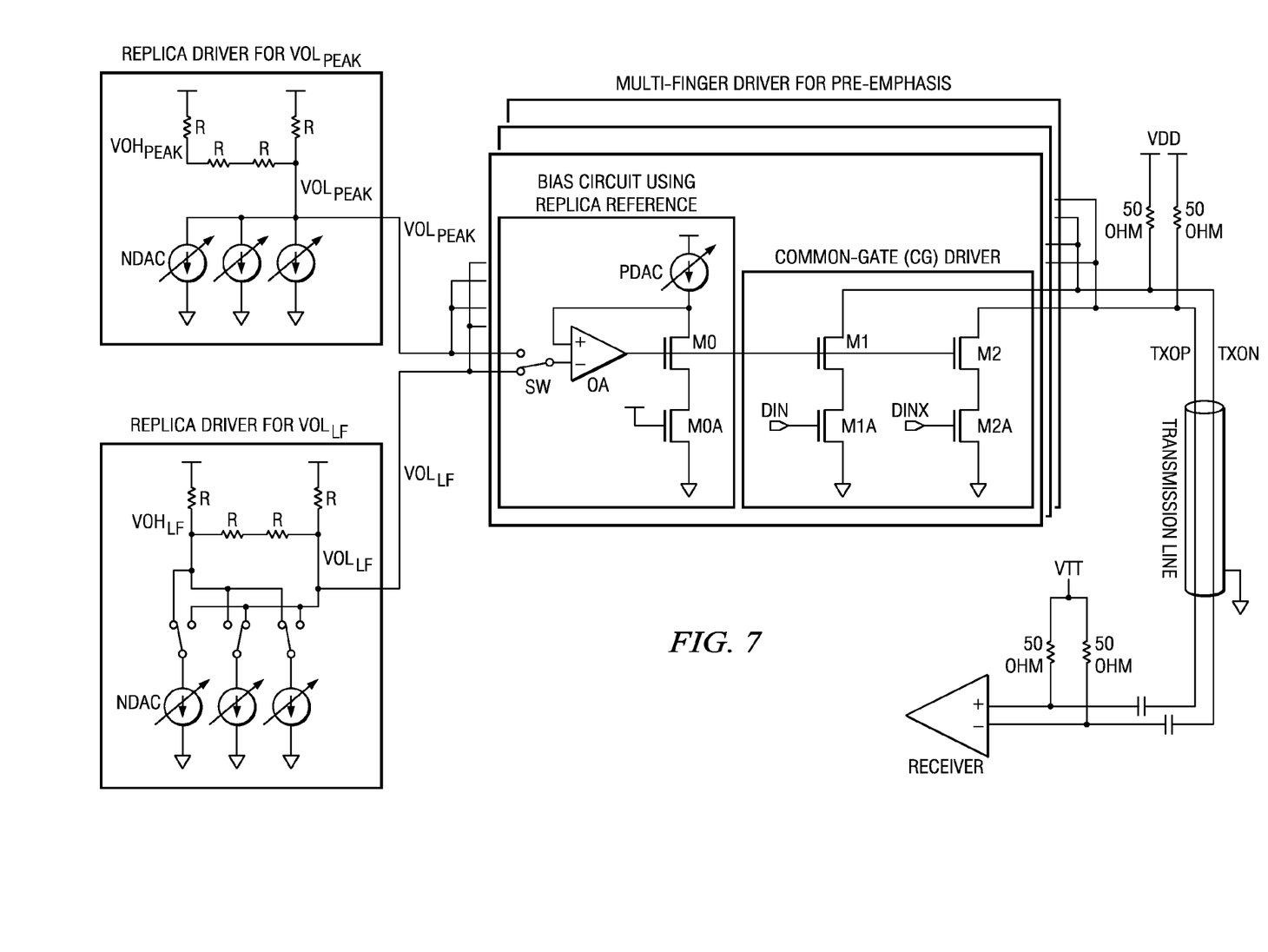
FIG. 7 illustrates an example multi-finger CG driver with multiple replica drivers and a switch before the operational amplifier (op-amp) in each circuit path.

FIG. 7 illustrates an example multi-finger CG driver with multiple replica drivers and a switch before the op-amp in each circuit path. The left top NDAC current source outputs the voltage $VOL_{Peak}$, which is the same as the ideal voltage V1. The left bottom NDAC current source outputs the voltage $VOL_{LF}$, which is the same as the ideal voltage V3. In particular embodiments, the circuits in FIG. 7 provide more flexibility in selecting the gate voltage for each CG driver, since each op-amp that controls its CG driver can be configured to $VOL_{Peak}$ or $VOL_{LF}$. Particular embodiments may select $VOL_{LF}$ for the main tap. Particular embodiments may select $VOL_{Peak}$ for the circuit paths providing preemphasis.

In particular embodiments, configurations like the one illustrated by FIG. 7 may be more accurate in controlling preemphasis ratio than configurations like the one illustrated by FIG. 5. In particular embodiments, configurations like the one illustrated by FIG. 7 produce less error at the output of the transmitter. Let symbols i0, i1, and i2 be errors corresponding to I0, I1, and I2, respectively, due to voltage difference between VOL and the voltages at the drain node of M1 and M2. With $VOL_{Peak}$ for preemphasis finger and $VOL_{LF}$ for main finger, the real driver-output voltage and the preemphasis ratio will be:

$$V1'=V1+37.5*i1$$

$$V2'=V2+12.5*i1$$

$$V3'=V3-12.5*(i0+i2)$$

$$V4'=V4-37.5*(i0+i2)$$

$$PE\ \text{ratio}' = 1 - \frac{(V4'-V3')}{(V2'-V1')} = \frac{(V2-V1-V4+V3-25*(i1-i0-i2))}{(V2-V1-25*i1)}$$

This result minimizes the variation in preemphasis ratio.

In particular embodiments, the replica architecture is not only applicable to CG drivers, but is applicable to LVDS drivers and current-mode logic (CML) drivers as well.

With respect to previous methods for addressing the problem of mismatched driver and bias current sources by improving the bias current source with a cascode topology, particular embodiments may facilitate the use of fewer and smaller devices and the use of less chip area in improving the bias current source. Particular embodiments, when applied to CG drivers, may provide lower signal-path capacitance. Particular embodiments, when applied to CG drivers, may provide faster slew rate. Particular embodiments, when applied to LVDS drivers may provide better return loss.

With respect to previous methods for addressing the problem of mismatched driver and bias current sources by creating a ratioed replica bias circuit corresponding to driver output that does not include any preemphasis function, particular embodiments may facilitate realization of preemphasis functionality. Particular embodiments may provide further reduction of variation in preemphasis ratio than a naïve extension of such previous methods.

Figure 8:
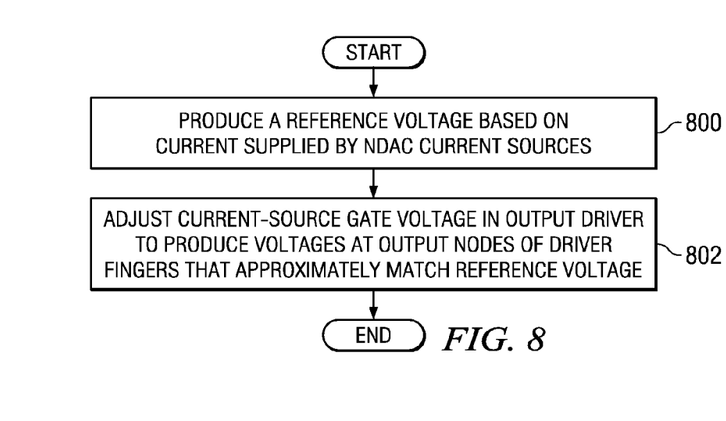
FIG. 8 illustrates an example method for a preemphasis driver with replica bias.

FIG. 8 illustrates an example method for a preemphasis driver with replica bias. The method starts at step 800, where a replica driver that includes multiple NDAC current sources produces a reference voltage based on current supplied by the NDAC current sources. At step 802, an op-amp in a driver bias circuit in each of multiple driver fingers that are coupled to the replica driver adjusts current-source gate voltage in the output driver to produce voltages at output nodes of the driver fingers that approximately match the reference voltage produced by the replica driver, at which point the method ends. Particular embodiments may continuously repeat the steps of the method of FIG. 8, according to particular needs. Although the present disclosure describes and illustrates particular steps of the method of FIG. 8 as occurring in a particular order, the present disclosure contemplates any suitable steps of the method of FIG. 8 occurring in any suitable order. Although the present disclosure describes and illustrates particular components carrying out particular steps of the method of FIG. 8, the present disclosure contemplates any suitable components carrying out any suitable steps of the method of FIG. 8.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed:
1. A system comprising:
  a low-frequency-period replica driver that comprises a plurality of n-type digital-to-analog converter (NDAC) current sources, the replica driver being operable to produce a low-frequency-period reference voltage based on current supplied by the NDAC current sources, wherein the replica driver further comprises a plurality of switches that are operable to selectively couple one of the NDAC current sources to a low-output voltage (VOL) node or a high-output voltage (VOH) node of the replica driver;

a peak-output-voltage replica driver that comprises another plurality of NDAC current sources, the peak-output-voltage replica driver being operable to produce a peak-output-voltage reference voltage based on current supplied by the other NDAC current sources; and a plurality of driver fingers that are coupled to the replica driver and each comprise a driver bias circuit and an output driver, the driver bias circuit comprising an operational amplifier (op-amp) that is operable to adjust current-source gate voltage in the output driver to produce voltages at output nodes of the driver fingers that approximately match the reference voltage produced by the replica driver, each one of the driver bias circuits comprising a switch that is operable to selectively couple an input of the op-amp in the driver bias circuit to the low-frequency-period reference voltage or the peak-output-voltage reference voltage.

2. The system of claim 1, wherein the output driver is a common gate (CG) driver.

3. The system of claim 1, wherein the output driver is a current mode logic (CML) driver.

4. The system of claim 1, wherein the NDAC current source is an n-type metal-oxide-semiconductor (NMOS) digital-to-analog converter (NDAC) current source.

5. The system of claim 1, wherein the driver fingers are preemphasis driver fingers.

6. The system of claim 1, wherein there are three NDAC current sources in the replica driver.

7. The system of claim 1, wherein there are three driver fingers.

8. The system of claim 1, wherein:
each of the driver bias circuits comprises a p-type digital-to-analog converter (PDAC) current source; and
each of the NDAC current sources corresponds to a particular one of the driver bias circuits, a first current of the NDAC current source mirroring a second current of the PDAC in the particular one of the driver bias circuits corresponding to the NDAC current source.

9. The system of claim 1, wherein a replica bias circuit in the replica driver comprises a plurality of replica resistors, each replica resistor having a first resistance value that is a multiple of a second resistance value of a driver output resistor coupled to the output nodes of the driver fingers.

10. A method comprising:
by a low-frequency-period replica driver that comprises a plurality of n-type digital-to-analog converter (NDAC) current sources, producing a low-frequency-period reference voltage based on current supplied by the NDAC current sources;
by a plurality of switches in the replica driver, selectively coupling one of the NDAC current sources to a low-output voltage (VOL) node or a high-output voltage (VOH) node of the replica driver;
by an operational amplifier (op-amp) in a driver bias circuit in each of a plurality of driver fingers that are coupled to the replica driver, adjusting current-source gate voltage in the output driver to produce voltages at output nodes of the driver fingers that approximately match the reference voltage produced by the replica driver;
by a peak-output-voltage replica driver that comprises another plurality of NDAC current sources, producing a peak-output-voltage reference voltage based on current supplied by the other NDAC current sources;
by a switch in each one of the driver bias circuits, selectively coupling an input of the op-amp in the driver bias circuit to the low-frequency-period reference voltage or the peak-output-voltage reference voltage.

11. The method of claim 10, wherein the output driver is a common gate (CG) driver.

12. The method of claim 10, wherein the output driver is a current mode logic (CML) driver.

13. The method of claim 10, wherein the NDAC current source is an n-type metal-oxide-semiconductor (NMOS) digital-to-analog converter (NDAC) current source.

14. The method of claim 10, wherein the driver fingers are preemphasis driver fingers.

15. The method of claim 10, wherein there are three NDAC current sources in the replica driver.

16. The method of claim 10 wherein there are three driver fingers.

17. The method of claim 10, wherein:
each of the driver bias circuits comprises a p-type digital-to-analog converter (PDAC) current source; and
each of the NDAC current sources corresponds to a particular one of the driver bias circuits, a first current of the NDAC current source mirroring a second current of the PDAC in the particular one of the driver bias circuits corresponding to the NDAC current source.

18. The method of claim 10, wherein a replica bias circuit in the replica driver comprises a plurality of replica resistors, each replica resistor having a first resistance value that is a multiple of a second resistance value of a driver output resistor coupled to the output nodes of the driver fingers.

* * * * *